UNITED STATES PATENT OFFICE.

CHRISTOPHER L. FRINK, OF ROCKVILLE, CONNECTICUT.

IMPROVEMENT IN RUBBER COMPOUNDS FOR THE MANUFACTURE OF PACKINGS, &c.

Specification forming part of Letters Patent No. 142,908, dated September 16, 1873; application filed September 11, 1873.

*To all whom it may concern:*

Be it known that I, CRISTOPHER L. FRINK, of Rockville, in the county of Tolland and State of Connecticut, have made a new and useful Improvement in Rubber Compounds, to be used in packing the joints in steam-engines, pumps, pipes, tubes, and the like, and for other purposes; and I hereby declare the following to be a full and exact description of the same.

Heretofore the various rubber compounds used for packing have been vulcanized, and sold in that condition for use in the arts. A very good packing of that kind is described in my patent of May 8, 1866; reissued June 11, 1872, No. 4,942.

By repeated experiment, I have ascertained that a better and more effective packing may be made by combining the materials in proper proportions for vulcanizing and inserting this compound in the place or position in which it is to be used and vulcanizing it in place. By this method the plastic compound perfectly conforms to the place it is to fill, entering every seam and joint, and forming a perfect packing.

My invention, therefore, consists in a composition of rubber, gutta-percha, or other vulcanizable gum, and sulphur, in suitable proportions for vulcanizing, with the addition of various earths, oxides, metallic filings, or other solid materials, so as to form, in place, when heated, a vulcanized packing. Heretofore a large number of compounds for rubber packing have been described, but they have always been vulcanized before being used or inserted in place. My invention differs in this, that I form the material in the manner now employed, suitable for being vulcanized, and in this condition it is an article of manufacture ready for use in forming packings. It may be rolled into sheets, or made into the form of rolls, strips, or in mass.

When used, it is inserted in the place to be packed, and the action of the steam, heated air, or other heating medium, will effect the hardening or vulcanizing. The proportion of sulphur to be added will depend upon the degree of hardness required in the packing. When a soft compound is to be formed, I use sulphur in the quantity required to form soft vulcanized rubber. For semi-hard, the requisite quantity for this compound, and for hard and very hard, the amount to form these respective compounds, is used. These, being well known to workers in rubber, need not be particularly specified.

To give body to the compound, and to give it the property of resisting the action of steam, oils, acids, gases, and the like, I add various earths, oxides, metal filings, and the like, such as plumbago, litharge, white lead, red lead, oxide of zinc, brass filings, or other metallic filings, soap-stone, steatite, French chalk, emery, asbestus, mica, plaster of paris, magnesia, barytes, infusorial earth, kaolin, or other earthy mineral substance.

When it is required to give lightness as well as elasticity to the compound, I add vegetable materials, such as paper-pulp, wood fiber, cork, or the like.

As my invention does not relate to the exact composition of the material, but only to its condition, I will not attempt to enumerate all the formulas by which the material is prepared. This varies with almost every special use to which the compound is applied.

The particular compound named in my former patent, above referred to, may be used. The following gives a good soft packing, viz: Rubber, ten parts; plumbago, twenty parts; carbonate of lead or litharge, six parts; brass filings, six parts: sulphur, two parts, all by weight.

Of course, by increasing the quantity of sulphur a harder compound may be produced—that is, a compound which, when placed in position, will be converted into a material resembling what is known as hard rubber. The amount of earthy or solid materials may be varied indefinitely, as is well known in the forming of vulcanized steam gum packing, and the like.

Having thus described my invention, what I claim, and desire to secure by Letters Patent, is—

1. The improved method herein described for forming compounds for packing, the same consisting in combining rubber, or other vulcanizable gum, with sulphur and other solid materials, such as named, and vulcanizing the compound in the place to be packed, substantially as specified.

2. The improved compounds herein described, suitable for steam and other packing, made by mixing, in proper proportions, india-rubber, or other vulcanizable gum, with sulphur and other solid materials, such as named, so as to form non-vulcanized but vulcanizable compounds for use, as described.

CHRISTOPHER L. FRINK.

Witnesses:
O. T. EARLE,
T. J. RIDER.